United States Patent Office 3,645,971
Patented Feb. 29, 1972

3,645,971
FIRE RETARDANT EPOXY RESINS CONTAINING PHOSPHORAMIDATES
Raymond R. Hindersinn, Lewiston, N.Y., assignor to Hooker Chemical Corporation, Niagara Falls, N.Y.
No Drawing. Filed Mar. 10, 1969, Ser. No. 805,865
Int. Cl. C08g 30/14
U.S. Cl. 260—47 CN
4 Claims

ABSTRACT OF THE DISCLOSURE

There is provided a process for producing fire retardant epoxy resins which comprises curing a mixture of (1) an epoxy resin and (2) a phosphoramidate of a formula selected from the group consisting of:

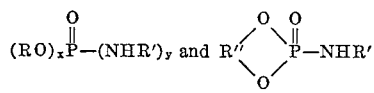

wherein R is alkyl, aryl, substituted alkyl or substituted aryl, R' is hydrogen or R, R" is hydrocarbylidene, $x$ is 0 to 2, $y$ is 1 to 3 and the sum of $x$ and $y$ is 3. An amine can be employed to improve the process.

BACKGROUND OF THE INVENTION

Imparting fire retardancy to epoxy resins by means of reactive halogen or phosphorus compounds is well-known in the art. However, use of halogen compounds such as chlorinated anhydrides encounters processing difficulties associated with dissolving a high melting solid into the epoxy resin at elevated temperatures. Triphenyl phosphate has also been used in fire retardant epoxy resins but cured products using this compound are somewhat deficient in hydrolytic stability. It is also known in the art to employ phosphorus compounds containing aniline groups to cure epoxy resins. Despite their nitrogen content, the fire retardant curing agents of the instant invention are not amines and, in fact, are not basic in character. The acidic nature of the compounds can be shown by titration with bases.

It is the object of this invention to provide new curing agents for epoxy resins. It is also the object of the invention to provide new reactive curing agents for epoxy resins. A further object is to provide curing agents which will impart fire retardancy to the epoxy resins. A still further object of the invention is to provide fire retardant epoxy resins whose physical properties are comparable to unmodified cured resins. These and other objects will become apparent to one skilled in the art in light of the following detailed description.

SUMMARY OF THE INVENTION

This invention relates to fire retardant epoxy resin curing agents. More particularly, this invention relates to a process for producing fire retardant epoxy resins which comprises curing a mixture of an epoxy resin and a compound of the formula:

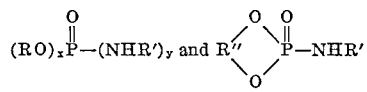

wherein R is alkyl, aryl, substituted alkyl, or substituted aryl, R' is hydrogen or R, R" is hydrocarbylidene, $x$ is 0 to 2, $y$ is 1 to 3, and the sum of $x$ and $y$ is 3, and to the products produced thereby. In a preferred embodiment, an amine is employed to improve the curing process.

DESCRIPTION OF THE PREFERRED EMBODIMENTS

In accordance with the invention, there are provided reactive curing agents of the formulae:

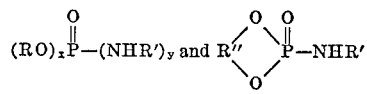

wherein R is alkyl or aryl, R' is hydrogen, alkyl or aryl, R" is hydrocarbylidene, $x$ is 0 to 2, $y$ is 1 to 3, and the sum of $x$ and $y$ is 3. The aryl groups which are represented by R and R' are preferably of from 6 to 20 carbons, more preferably of 6 to 10 carbons, and still more preferably are substituted or non-substituted phenyl groups, the substituents, if any, being alkyl and/or halogen. The alkyl groups of R and R' are preferably of 1 to 12 carbon atoms and more preferably are halogenated or non-substituted alkyl of 1 to 6 carbon atoms. Thus, the more preferred alkyl groups include methyl, ethyl, propyl, butyl, amyl and hexyl groups which may have halogen substituents. By hydrocarbylidene is meant the radical obtained by the removal of two hydrogen atoms from a hydrocarbon, and thus encompasses radicals such as methylene, ethylene, ethylidene, trimethylene, and the like. The hydrocarbylidene groups are preferably derived from alkanes of 1 to 10 carbon atoms.

Typical phosphoramidates which can be employed in this invention include:

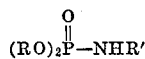

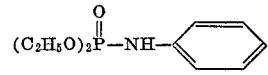

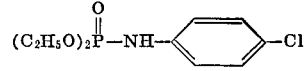

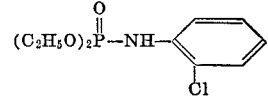

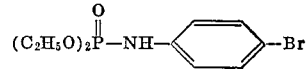

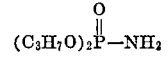

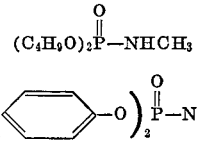

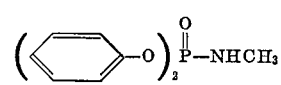

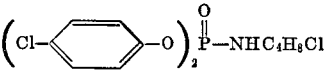

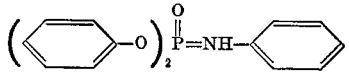

of the formula

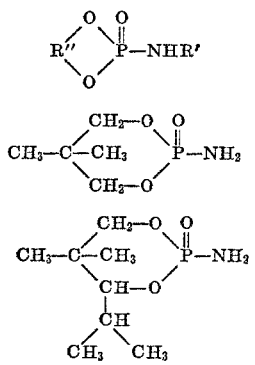

of the formula

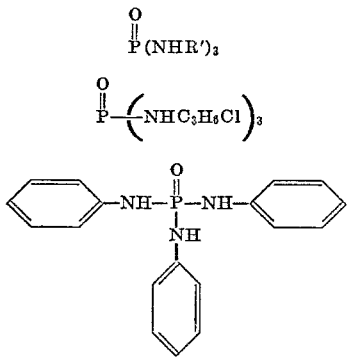

of the formula

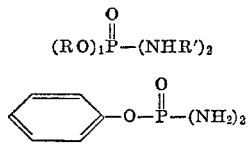

The polymers cured by the process of this invention are any of those materials known in the art as epoxy resins. Included with this classification are resins such as the well-known reaction products of a dihydric phenol and a halohydrin, epoxidized hydrocarbons, epoxidized vegetable oils, as well as naturally occurring materials of the same type containing the oxirane ring structure. By the terms "epoxy resin or polyepoxide" as used herein is meant the compounds which contain adjacent carbon atoms to which oxirane oxygen is attached. The epoxy resins that are the reaction products of a dihydric phenol and halohydrin are generally obtained by reacting at a temperature of about 50 to 150 degrees centigrade at least one mole of the halohydrin, such as epichlorohydrin, glycerol dichlorohydrin, 3-chloro-1,2-propanediol, and the like, with one mole of the dihydric phenol, such as resorcinol, dihydroxy diphenylmethane, polyhydric phenol formaldehyde condensation products, and the like, in the presence of an alkali metal hydroxide such as sodium and potassium hydroxide, or an alkaline earth hydroxide such as calcium and barium hydroxide. The epoxy resins which are formed by epoxidizing unsaturated hydrocarbons can be prepared, for example, by reacting the unsaturated polyolefin, such as polyisoprene, polybutadiene, and the like, with a suitable reactant such as acetyl peroxide for several hours at an elevated temperature. Another type of epoxy resin useful in this invention are the polyepoxides derived from naturally occurring vegetable oils, or their derivatives, such as epoxidized soybean oil, epoxidized linseed oil, epoxidized glycerol dilinoleate, and the like. Such materials are prepared, for example, by agitating the compound to be epoxidized with a peracetic acid solution, prepared from glacial acetic acid, 30 percent hydrogen peroxide and one percent sulfuric acid catalyst.

In the practice of the invention, the phosphoramidate curing agent is mixed with the desired uncured epoxy resin at room temperature or at an elevated temperature. The curing agent is preferably incorporated in an effective fire retardant amount, i.e., in an amount sufficient to provide fire retardancy, which generally is about 5 to about 25 percent by weight based on the total weight of the mixture, and preferably about 7 to about 15 weight percent. The curing temperatures can vary over a wide range from 50 to about 250 degrees centigrade, but preferably in the range of about 100 to about 200 degrees centigrade. The amount of time necessary to effect curing varies with the particular ingredients of the curing system, from several minutes to several days, however it is preferably from about 0.5 to about 48 hours.

In a preferred embodiment of the invention an amine is employed in conjunction with the phosphoramidate curing agent. Typical amines are ethylamine, monoethanolamine, formamide, aniline, N-aminoethyl morpholine, ethylene diamine, diethylene triamine, triethylene tetraamine, propylene diamine, 3,3'-biphenyl diamine, piperazine, triethyl amine, dimethyl-sec-butylamine, N-methyl-N-ethylaniline, and the like. The preferred amine is diethylene triamine. The amine generally contains 1 to 5 amino groups and 1 to 20 carbon atoms, and is employed in concentrations varying from about 0.1 to 20 weight percent based on the weight of the epoxy resin.

A variety of other additives can be incorporated into the epoxy resin to modify the properties of the ultimately cured resin product. These additives include reactive liquid diluents such as trimethyl phosphate, triphenyl phosphite, and the like, plasticizers such as dioctylphthalate, liquid polysulfide rubbers, liquid polyamides, aliphatic epoxides, and the like; reinforcing agents such as fibers in the form of cloth, mat, or chopped strands or staple; inert fillers such as alumina, silica glass, calcium carbonate, quartz, iron oxide, graphite, titanium dioxide, asbestos, and the like; thickening agents such as certain silicas, bentonite, and the like; and a variety of colorants.

The following examples are presented to further illustrate the invention, but are not intended to limit it. All parts and percentages in this specification and claims are by weight and temperatures in degrees centigrade unless specified otherwise.

EXAMPLE 1

Ten parts by weight of

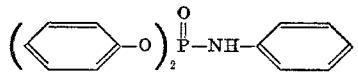

1 part diethylene triamine, and 100 parts of a liquid, bisphenol-A-epichlorohydrin epoxy resin were mixed and subjected to a 120 degrees centigrade cure for 24 hours. The resulting resin was very stiff.

EXAMPLE 2

Example 1 was repeated except that the phosphoramidate was

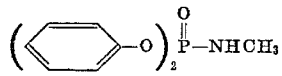

The resulting resin was a cured, hard product.

EXAMPLE 3

The procedure of Example 1 was repeated except that the phosphoramidate was

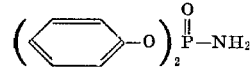

The resulting product was a cured, hard, clear product.

EXAMPLES 4–5

Five parts of

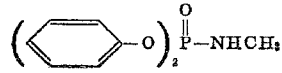

and a small amount of the epoxy resin of Example 1 were mixed to form a paste. The remainder of the epoxy resin and diethylene triamine were mixed to homogeneity and thereafter the two mixes were combined. A second composition was prepared in which the phosphoramidate was omitted. Both compositions were subjected to a curing cycle of 24 hours at room temperature and thereafter 24 hours at 120 degrees centigrade. The resulting cured products were tested for fire retardancy by the ASTM D–635 test and the Barcol Hardness of the products was determined. The results are given in Table I.

TABLE I

| Example | 4 | 5 |
|---|---|---|
| Epoxy resin, parts | 50 | 50 |
| Phosphoramidate, parts | 5 | 0 |
| Diethylene triamine, parts | 5 | 5 |
| Barcol hardness | 28 | 29 |
| Self-extinguishing time, seconds | 12 | Burning |
| Distance burned, inches | 0 | >4 |

EXAMPLE 6

One hundred parts of the epoxy resin of Example 1, 10 parts of

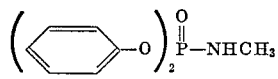

and 1 part of diethylene triamine were mixed and cured for 24 hours at 120 degrees centigrade and thereafter for 16 hours at 150 degrees centigrade. The resulting cured composition was hard and had a heat distortion temperature at 264 p.s.i. of 74 degrees centigrade. It was determined by the ASTM D–635 test that the product had a self-extinguishing time of 30 seconds. In contrast, when 100 parts of the epoxy resin and 10 parts of diethylene triamine were mixed and subjected to the same curing cycle, the product was a hard, cured product which was rated burning by the ASTM D–635 test.

EXAMPLE 7

Example 6 was repeated except that the phosphoramidate was

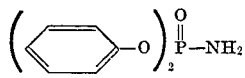

After the curing cycle, the resin was a hard, cured product with a heat distortion temperature at 264 p.s.i. of 52 degrees centigrade. The self extinguishing time of the composition, as determined by the ASTM D–635 test was 32 seconds.

EXAMPLE 8

Example 6 was repeated except that the curing cycle employed was 24 hours at 120 degrees centigrade and then 16 hours at 180 degrees centigrade. The resulting composition was found to be a hard, cured product having a Barcol Hardness of 30 and a heat distortion temperature of 91 degrees centigrade at 264 p.s.i. The self-extinguishing time, as determined by the ASTM D–635 test, was 12 seconds.

EXAMPLE 9

Example 7 was repeated except that the curing cycle was 24 hours at 120 degrees centigrade and thereafter 16 hours at 180 degrees centigrade. The resulting composition was a hard, cured product having a Barcol Hardness of 30 and a heat distortion temperature of 75 degrees centigrade at 264 p.s.i. The self-extinguishing time of the cured epoxy resin was 18 seconds.

EXAMPLE 10

One hundred parts of the epoxy resin of Example 1 was mixed with 10 parts of

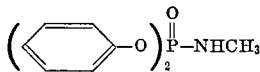

and subjected to a curing cycle of 24 hours at 120 degrees centigrade followed by 16 hours at 180 degrees centigrade. The resulting composition was a hard, cured product which had a self-extinguishing time of 20 seconds as determined by the ASTM D–635 test.

EXAMPLE 11

Five parts by weight of neopentylphosphoramidate, one part of diethylene triamine and 100 parts of a liquid, bisphenol-A-epichlorohydrin epoxy resin were mixed and cured at 120 degrees centigrade for 24 hours and then at 180 degrees centigrade for 24 hours. The resulting cured product was found to be non-burning by the ASTM D–635 test method.

EXAMPLE 12

Example 11 was repeated except that the level of neopentylphosphoramidate was increased to 10 weight percent. The resulting cured plate casting was found to be non-burning by the ASTM D–635 test.

EXAMPLES 13–14

Examples 11 and 12 were repeated except that the neopentylphosphoramidate was replaced with (2,2,4-trimethyl-1,3-pentane)phosphoramidate. The cured products were determined to be non-burning by the ASTM D–635 test.

EXAMPLE 15

Ten parts of phosphoryltrianilide, 1 part of diethylene triamine and 100 parts of a liquid bisphenol-A-epichlorohydrin epoxy resin are mixed and subjected to a 190 degrees centigrade cure for 24 hours. The resulting product is a hard, cured product.

Various changes and modifications can be made in the process and products of this invention without departing from the spirit and scope of the invention. The various embodiments of the invention disclosed herein serve to further illustrate the invention but are not intended to limit it.

I claim:
1. A composition comprising (1) an epoxy resin having the oxirane oxygen attached to adjacent carbon atoms and (2) a phosphoramidate of the formula:

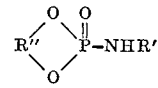

wherein R' is hydrogen, alkyl, aryl, halogen substituted alkyl, alkyl substituted aryl or halogen substituted aryl and R" is hydrocarbylidene, wherein said phosphoramidate is present in an amount from about 5 to about 25 percent by weight of the total mixture.

2. A composition comprising (1) an epoxy resin having the oxirane oxygen attached to adjacent carbon atoms, (2) an amine, and (3) a phosphoramidate of the formula:

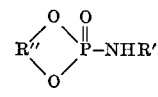

wherein R' is hydrogen, alkyl, aryl, halogen substituted alkyl, alkyl substituted aryl or halogen substituted aryl and R" is hydrocarbylidene, wherein said phosphoramidate is present in an amount from about 5 to about 25 percent by weight of the total mixture.

3. The cured reaction product of components comprising (1) an epoxy resin having the oxirane oxygen attached to adjacent carbon atoms, (2) an amine, and (3) a phosphoramidate of the formula:

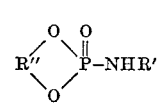

wherein R' is hydrogen, alkyl, aryl, halogen substituted alkyl, alkyl substituted aryl or halogen substituted aryl and R" is hydrocarbylidene, wherein said phosphoramidate is present in an amount from about 5 to about 25 percent by weight of the total mixture.

4. The composition of claim 1 wherein said phosphoramidate has the formula

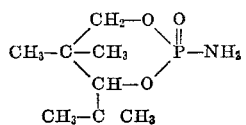

References Cited

UNITED STATES PATENTS 3,013,049  12/1961  Holtschmidt et al.
                                  260—47 Ep CN
3,385,914  5/1968  Hindersinn et al. __ 260—2 Ep
3,516,965  6/1970  Washburn _____ 260—2 X WILLIAM H. SHORT, Primary Examiner
T. E. PERTILLA, Assistant Examiner U.S. Cl. X.R.

260—2 P, 2 N, 18 Ep, 31.8 E, 37 Ep, 59, 94.6, 830